ns to the surrounding oxygen-containing atmosphere.

3,093,488
PREPARATION OF STABLE DEHYDRATED PRODUCTS

Robert P. Graham, El Cerrito, Lewis F. Ginnette, San Leandro, and Arthur I. Morgan, Jr., Berkeley, Calif., assignors to the United States of America as represented by the Secretary of Agriculture
No Drawing. Filed July 21, 1961, Ser. No. 125,879
13 Claims. (Cl. 99—199)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of new methods for preparing dehydrated products. A particular object of the invention is the provision of novel procedures for preparing dehydrated products of improved initial quanlity as well as improved stability as regards retention of color, flavor, nutritive value, and other significant characteristics. Further objects and advantages of the invention will be apparent from the following description, wherein parts and percentages are by weight, unless otherwise specified.

Primarily, the present invention concerns improvements in the method of dehydration generally known as "foam-mat" drying. In this method—disclosed, for example, in the U.S. Patent of Morgan, Randall, and Graham, No. 2,967,109, issued January 3, 1961—a material to be dehydrated is first formed into a foam by incorporation of a gas and a foam-stabilizing agent. The resulting foam is then spread in a relatively thin layer and contacted with a current of hot air to effect the dehydration. During this dehydration, the temperature of the air is controlled so that the foam essentially retains its original volume. Thereby the final product is in a very porous condition and hence rehydrates very rapidly and completely when contacted with water for ultimate use. Moreover, preservation of the volume of the foam during dehydration makes the drying operation efficient because moisture can diffuse readily and rapidly out of the foamy mass. Also, under these conditions the dehydration is accomplished without substantial damage to color, flavor, nutritive value, or other vital attributes of the material even when the rate of drying is forced by application of high temperatures which would be totally ruinous to the same material in non-foamed condition.

As explained above, a special characteristic of the foam-mat process is that it yields dehydrated products in an extremely porous state. In some instances certain problems have arisen which are attributable to the extremely porous character of the product. An object of the present invention is to provide procedures whereby these problems can be obviated in a simple and effective manner. The situation is further explained below, having particular reference to the dehydration of tomato products as an illustrative example. When tomato juice concentrate is dehydrated by the foam-mat process as above described, the product has a pink color rather than the typical red-orange tomato color. This color distinction is attributed to an optical phenomenon, that is, the light-scattering effect of the myriad of minute voids in the dried particles. Another point is that if the said product is stored in contact with air it develops a brown color. This is attributed to an oxidation of the natural red coloring principle (lycopene) and is often noticeable in three days' storage in open containers at room temperature. The rapidity of the oxidation is again due to the porosity of the product, that is, tremendous surface area that it presents to the surrounding oxygen-containing atmosphere.

The problems explained above in connection with tomato products are of general occurrence with other materials dried by the known foam-mat process. Thus, the dried products exhibit an initial color which is paler than the raw material and when the products are stored in contact with air, oxidation reactions take place wherever the products contain oxidation-labile constituents, that is, constituents which are susceptible to oxidation by contact with oxygen. The results of such reactions include color changes, development of unnatural odor and/or taste, destruction of vitamins, vitamin precursors, and other labile nutrient factors. In addition, many dry products prepared by the technique described above exhibit a very low bulk density. This may sometimes be undesirable as involving high packaging costs in marketing the product.

In accordance with the invention, the disadvantages outlined above are avoided by a procedure which basically involves the following steps: the material to be dehydrated is gasified and formed into a stable foam. The resulting foam is then dehydrated, preferably by contacting it with hot air or other hot gas, at atmospheric pressure, to cause evaporation of moisture. The temperature of the gaseous dehydration medium is controlled so that the foam essentially retains its original volume during dehydration. When the material is thus converted into a porous dehydrated product it is subjected to a surface-sealing treatment. Following this treatment, the material is again subjected to dehydration, if necessary, to remove any moisture added during the surface-sealing treatment. The resulting products are markedly different from those prepared by the usual foam-mat process. Thus, the products of the present invention exhibit the natural color of the starting material. For example, a product prepared from tomato juice in accordance with the invention exhibits a bright red color in contrast to the pale pink of prior foam-mat dried products. Moreover, the product of the invention is stable in that it can be stored for long periods in contact with air without undergoing color, flavor, or nutritive changes. Furthermore, the bulk density of the products is materially increased so that packaging costs are less.

A special feature of the invention is the aforementioned surface-sealing treatment. This step can be effectuated in a variety of ways, for example, by exposing the material to moisture, heat, or a combination of moisture and heat. Also, pressing may be employed in conjunction with moistening and/or heating to assist in attaining the desired end. As a result of such operations there occurs a limited fusion or melting so that the surface of the product becomes denser and less porous, hence less pervious to fluids. The effect of this treatment might be described as a leveling or evening of the surface of the product caused by a filling in of surface pores by melting material and a rounding off of sharply projecting edges, angles, and similar formations, the net result being that the surface of the material is smoother and less porous. Since the action is largely concentrated in surface areas, it is herein referred to as a surface-sealing or surface-localized fusing or melting. The duration and other conditions of the surface-sealing treatment are limited to prevent the product from fusing entirely or losing all its porosity. If this were to take place, the product would have very slow rehydration characteristics. However, by observation of the product during the treatment it is a simple matter to stop the treatment at the desired point when the surfaces of the particles are sealed whereas the particles are still, especially in inner portions, in a porous condition. From a practical standpoint the changes effectuated by the process of the invention cause a restoration of natural color as well as making the products more stable because the surface area they present to the ambient atmosphere is substantially decreased. Moreover, although the surface-sealing treatment entails a reduction in the speed at which the products may be rehydrated so that they can no longer be regarded as instantaneously-rehydratable, they still can be rehydrated as readily as vacuum "puff-dried" proucts, spray-dried products, or similar competitive products.

A convenient way to effect the surface-sealing is to place the dehydrated product on trays and expose it to heated moist air. In a typical embodiment of the invention one may use air having a relative humidity of about from 60 to 100%. These limits, however, are by no means critical and one may employ air at any relative humidity which is above the equilibrium relative humidity of the dehydrated product at its existing moisture content. For example, if the dehydrated product to be treated exhibits an equilibrium relative humidity of 32%, then the air applied to it may have any relative humdiity above 32%, in which case moisture will move from the air to the product as, of course, desired in this step. The temperature at which the step is carried out may be varied widely and generally more rapid surface-sealing is obtained with higher temperature. A convenient range of temperature is from about 100° F. to 212° F. In any case, the temperature should not be high enough to cause the particles to fuse or totally lose their porous character. The maximum temperature which can be used with any particular product can be easily determined by pilot trials at different temperatures and observing the effects. Temperatures which cause an undesirable diminution in volume of the mass of product being treated or a gross fusion or melting of the particles are to be avoided. The time of treatment will vary on such factors as the properties of the product being treated, the moisture content of the moist air applied to the product, the temperature of treatment, and the degree of contact between the particles and the surrounding atmosphere of moist air. The proper time of treatment in any particular case may readily be gauged by observing the product under treatment. With pigmented products such as dehydrated tomoto juice, orange juice, apricot puree, carrot puree, etc., an adequate surface-sealing effect is denoted by a marked change in color from a pale color to one distinctive of the commodity in question. With non-pigmented products, or even with pigmented ones, the process can be followed by examining the particles at intervals with suitable optical equipment to ascertain the point at which the surface of the particles becomes glazed or sealed. In any event, the moistening should not be extended to such a degree that the particles under treatment fuse or completely lose their porous character.

It is obvious that many alternatives are possible in applying the moist-gas surface-sealing treatment. For example, as a matter of convenience, moist air is usually employed. However, the air in this case is merely a carrier or diluent and any other gas can be employed, as carbon dioxide, nitrogen, nitrous oxide, helium, etc. Naturally, when food products are being handled, a non-toxic gas is used as the carrier. The moisture can also be applied in the absence of a carrier gas as by treating the product in a sealed vessel whereby it may be contacted with pure water vapor at a selected pressure and temperature. Although it is generally convenient to treat the product while it is supported on a flat surface, such as a perforated tray, one may put the product in a rotating cylinder of screening or perforated metal and contact it with moist gas. In this way the rotation of the cylinder will effect a tumbling of the particles so that faster and more uniform surface treatment will result.

It is evident that where the surface-sealing treatment involves an application of moisture to the product, it is necessary to then re-dry the product. This final dehydration can be accomplished by any of the methods herein disclosed for the original dehydration. As an example, the moistened product is contacted with hot air, for instance at 100 to 300° F., until it is re-dried to the desired degree. Usually, the final product contains 6%, or less, of water. The particular temperature employed in this final dehydration will, of course, depend on the nature of the material being treated and a temperature is chosen such that it will not damage the product. Thus, for example, with fruit and vegetable products a temperature not above about 150° F. would ordinarily be used. This final dehydration can be effectively accomplished in bin dryers, pneumatic (air-lift) dryers, or the like.

A variation of the above-described surface-sealing by application of moist air involves conducting this step during the dehydration by suitable regulation of the character of the gaseous medium applied to the foam. Thus, for example, the foarm may be exposed to a gaseous dehydrating medium until a major proportion of the moisture originally present in the foam is evaporated, that is, until the product loses its plastic nature and is essentially a solid; this will usually be at a moisture content below 15%, preferably 10% or less. At this point, moisture may be added to the gaseous medium to effect the above-described surface-sealing. After this result is accomplished, the product is again contacted with the gaseous dehydrating medium to complete the dehydration so that the product will be in a self-preserving condition. This procedure has the benefit that the same equipment is used both for dehydration and for moistening, the change from one process to the other being readily attained by change in the character of the gaseous medium being applied to the material under treatment.

In a preferred method of conducting the surface-sealing treatment, compression is applied to the material. This compression is usually done by passing the material between a pair of rotating drums although it is evident that other systems can be applied such as rolling a drum over the material while it is supported on a flat surface. The drums, rollers, or other surfaces which contact the material are preferably heated as by internal circulation of steam or hot water. The amount of compression is regulated so that the product is made denser yet not compressed enough to eliminate all its porosity. In any particular case the proper degree of pressure can be gauged by observing the character of pilot batches of material which have been subjected to compression and selecting a degree of pressure which causes the surface of the material to be sealed—that is, fused or glazed— while the product, especially in inner portions thereof, is still in a porous condition. To facilitate this pressing and to avoid rupture of cellular structure, etc., the material is tempered as by moistening and/or heating prior to application of the pressing operation. The degree of such tempering required in any particular case will depend on a variety of factors including the nature of the material, its moisture content, the temperature at which the pressing surfaces are maintained, the degree of densification to be achieved, and the like. In any particular situation pilot trials may be conducted with application of different degrees of moistening and/or heating and selecting those tempering treatments which so soften the surface of the material that it can be readily compressed to yield a product of the desired characteristics. In any case the extent of moistening and heating should not be such as to liquefy or fuse the entire mass of material but merely to soften it, especially at the surface thereof. Since most dehydrated materials are softened by either moistening or heating, it is evident that in a situation where the softening is achieved largely by moistening, the degree of heating will be small or even non-existent whereas if the softening is achieved largely by heating the amount of moistening will be small or it may not even be necessary to apply moisture. In view of the many variables involved it is impossible to numerically define the limits of tempering applicable to all situations. However, it is observed that with many fruit and vegetable products the proper tempering conditions will lie within the ranges: Moisture content about 10 to 35% and temperature about 70 to 200° F. In a particularly preferred embodiment of the invention the dehydrated product is tempered solely by heating and then pressed. In this way one eliminates the final dehydration operation required where a moistening step is involved.

The process of the invention is of wide applicability and can be applied to materials of all types. Typical materials which may be treated in accordance with the invention are set forth below merely by way of example and not limitation. These materials, when already of a liquid character, may be converted into foams directly or after suitable adjustment of texture and processed as herein described to yield the dehydrated, stabilized products. Where the materials are of a solid nature they may be converted to liquid form by application of conventional techniques such as extraction with water, comminuting, pressing, cooking in water, steaming, or other known techniques as may be applicable to the particular material in question.

Fruits and vegetable products: Juices, extracts, pulps, purees and similar products derived from fruits or vegetables such as orange, grapefruit, lemon, lime, apple, pear, apricot, strawberry, rasberry, pineapple, grape, prune, plum, peach, cherry, tomato, celery, carrot, spinach, lettuce, cabbage, potato, sweetpotato, watercress, etc. The liquid products may be prepared in customary manner by subjecting edible portions of the produce to such operations as reaming, pressing, macerating, crushing, comminuting, extracting with water, cooking, steaming, etc. These operations may be applied to the fresh produce or to processed produce, that is, produce which has been subjected to such operations as cooking, blanching, freezing, canning, sun-drying, sulphiting, or preservation by application of chemical preservatives or ionizing radiations.

Meat and fish products: Meat extracts, meat juices, soups or broths made from meat or fish products, clam juice, osyster stew, fish or clam chowders, etc.

Lacteal products: Whole milk, skim milk, whey, cream, buttermilk, yogurt, cheeses, milk products containing flavorings such as chocolate, cocoa, sugar, and the like, vitamin-fortified milk products, malted milk, etc.

Cereal products: Extracts of grains or slurries of finely-divided cereal material made from wheat, barley, malted barley, rice, corn, etc.

Feed materials: Juices, extracts, purees, and other liquid products made from forages or feeds such as alfalfa, clover, grasses, cottonseed meal, soybean meal, corn stalks, hay, ensilage liquors, sugar cane, sugar beets, sorghum, fish meal, animal blood, bone meal, tankage, fish stick liquors, feather meal, meat scraps, fish heads, dairy, slaughterhouse or fishery wastes, etc.

Beverages: Aqueous extracts of coffee, tea, chocolate, yerba mate, roasted cereal products (simulated coffee products), etc.

Carbohydrate substances: Honey, maple syrup, corn syrup, sorghum syrup, malt syrup, molasses, syrups obtained from the saccharification of wood, cotton linters or other cellulosic materials. Dispersions—that is, true solutions, colloidal solutions or suspensions—of sucrose, dextrose, invert sugar, fructose, maltose, lactose, dextrins, dextrans, starches, natural gums such as tragacanth, acacia, arabic, locust bean, karaya, carrageen, pectins, algins, low-methoxyl pectins, etc., synthetic gums such as methyl cellulose, carboxymethyl cellulose, carboxymethyl amylose, carboxymethyl amylopectin, etc.

Egg products: Egg white, egg yolk, whole egg, or preparations of egg with other foods such as milk or cream, custard or salad dressing preparations.

Industrial wastes: Liquid products derived from such materials as stick liquor, corn steep liquor, fruit cannery wastes, citrus peels and reaming residues, cull fruits and vegetables, tops of root vegetables, residues from fermentation operations such as broths, mashes, and distillers' slops.

Miscellaneous: Animal glues, mucilages from plant sources, starch pastes, solutions or bark extracts or other tanning agents, solutions of proteins or protein hydrolysates, solutions of sorbitol, mannitol, citric acid, tartaric acid, etc. Vitamin preparations such as solutions of ascorbic acid, thiamin or other vitamins, vitamin concentrates or vitamin precursors, fermentation products such as mushroom mycelium, yeast, microbial cultures, bacterial enzyme preparations, and biosynthesized compounds such as antibiotics, vitamins, etc.

The liquid preparation to which the process of the invention is applied need not be a true solution but may contain suspended matter entirely or in addition to dissolved matter. The invention is thus generically applicable to the dehydration of any liquid, this term being used in the sense of including any type of material which is capable of flowing.

In preparing a foam from the liquid to be dried it is required that the liquid have sufficient body to produce a stable foam. In most cases this requirement is met when the liquid contains so must suspended and/or dissolved solids that it has a thick consistency like that of a syrup, or paste. Thus, depending on the character of the liquid, it may be necessary to concentrate it by evaporation of water—or other conventional concentration technique—to increase its body. For example, ordinary juices such as orange juice and tomato juice are too thin to form stable foams. Accordingly, the juices are first concentrated to a level of at least about 20% or more, preferably to such an extent that they have a sauce-like or pasty consistency. Ordinary milk is another example of a substance which needs to be concentrated to build up its body prior to foaming it. In cases where the liquid is to be increased in body, this is generally accomplished by removal of water. However, other techniques can be used in place of, or in conjunction with, such techniques. For example, the consistency of juices, purees, and the like, can be increased by application of homogenization or colloid milling. Another plan is to add bodying agents such as dextrins, starch, pectin, algin, or other natural or synthetic gums. In the case of non-edible products, body can be increased by incorporation of minor amounts of finely-divided solids such as kaolin, bentonite, other types of clays, silica, hydrated forms of silica, silicic acid, diatomaceous earths, etc., or water-soluble inorganic bodying agents such as sodium silicate. On the other hand, such materials as molasses, honey, corn syrup, starch pastes, and the like, already have sufficient body that no increase in solids content is needed. Moreover, some materials may require dilution with water to give them proper liquid characteristics. For example, in applying the process to such relatively high-solids materials as pulped raisins, dates, figs, mashed cooked potatoes, or the like, it is generally necessary to add some water to the pulp so that it will flow more readily and will be adaptable to incorporation of a gas to form a foam. It will be evident to those skilled in the art from the above explanation that in any specific instance the liquid to be dehydrated is to be adjusted to a thick, more or less pasty consistency by conventional techniques so that it will be amenable to forming a stable foam.

In preparing the foam, a gas is incorporated into the liquid by conventional techniques. Although air is generally used as the gas it is by no means essential to use it and any gas may be employed. In preparing edible products, non-toxic gases are used such as air, nitrogen, carbon dioxide, nitrous oxide, helium, propane, n-butane, isobutane, dichlorodifluoromethane, trichloromonofluoromethane, or monochlorotrifluoromethane. Incorporation of the gas into the liquid may be accomplished in any of the conventional methods used, for example, in aerating ice cream, salad dressings, etc. A simple method where air is to be incorporated is to whip the liquid with a rotating wire whip which beats air into the mixture. For best results it is preferred that the gas bubbles be dispersed uniformly throughout the foam and be of uniformly small size, i.e., about 100 microns or less in diameter. Such techniques as homogenizing may be employed to increase uniformity and decrease the size of the gas bubbles. Also, the mixture may be cooled during the foaming operation to promote formation of a stable foam. Where cooling is used, any temperature below room temperature may be applied provided it is not low enough to freeze the foam. The amount of gas incorporated into the liquid may be varied widely. Generally it is preferred to incorporate enough gas to increase the volume of the liquid 1.5 times, more preferably about 2 to 3 times. It is evident that the greater the volume increase the more bulky will be the final product because of a greater proportion of volume of voids to total volume. In some cases it may not be desired to produce a too-bulky end product (because of increased packaging costs) and in such case, the volume increase may be limited, say, to not over 5 times. However, if bulk of the final product is not a consideration, the volume increase may be as much as desired, up to, say, 10 or 20 times original volume of the liquid. It is evident from the above that the volume increase achieved in forming is not a critical item and may be varied as desired under particular circumstances.

In many instances it is not feasible to form a stable foam merely by incorporation of a gas into the liquid. Accordingly, it is preferred to add to the liquid before or during foaming, a minor proportion of a foam-stabilizing agent. The chemical nature of the foam-stabilizing agent is of no moment to the operability of the invention as long as the agent possesses the ability to stabilize foams. Various examples of suitable agents are listed hereinafter. The proportion of foam-stabilizing agent will vary depending on the properties of the liquid, the properties of the agent in question, etc. In general, the proportion of the agent may vary about from 0.1 to 5.0% by weight based on the weight of solids in the liquid. It is naturally desirable to use the lowest proportion of foam-stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

The foam stabilizer may be a surface-active agent or a hydrophilic colloid or a mixture of the two.

Typical examples of classes of surface-active agents and individual compounds which may be used are listed below:

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R-CO-(OC_2H_4)_n-OH$$

where R—CR is the acyl radical of a fat acid such as lauric, palmitic, oleic, stearic, etc. and $n$ has a value from 6 to 60.

Condensation products of ethylene oxide with long-chain aliphatic alcohols, i.e., compounds of the formula $$R-(OC_2H_4)_n-OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl ($C_8$–$C_{20}$) benzene sulphonates. Typical in this class are sodium dodecyl benzene sulphonate and sodium hexadecyl benzene sulphonate.

Alkyl esters of sulphosuccinic acid, for example, the sodium salt of dioctyl sulphosuccinate.

Sulphonated or sulphated fatty acid esters or amides, i.e., compounds of the types:

$$RCO-O-CH_2-CH_2-SO_3Na$$
$$RCO-NH-CH_2-CH_2SO_3Na$$
$$RCO-O-CH_2-CH_2-OSO_3Na$$

and $RCO-NH-CH_2-CH_2-OSO_3Na$, wherein RCO— represents the acyl radical of a long-chain fatty acid such as lauric, myristic, palmitic, stearic, oleic, etc.

Condensates of ethylene oxide and alkyl phenols, that is, compounds of the type $$R-C_6H_4-(OC_2H_4)_nOH$$

wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hyodesoxycholic acid, dehydrodesoxycholic acid, dehydrohyodesoxycholic acid, lithocholic acid, glycocholic acid, or taurocholic acid.

It will of course be appreciated that the particular surface-active agent for use in the process of the invention will be selected according to the use which is to be made of the final product. Thus, where the product is intended for edible purposes, the surface-active agent selected will be one which is edible or at least which may be ingested without adverse effects. Thus, for the production of edible products, we prefer to use surface-active agents of the class of fatty acid esters of sorbitan or mannitan, agents of the class of polyoxyethylene sorbitan (or mannitan) fatty acid esters, agents of the class of polyoxyethylene derivatives of higher fatty acids, e.g., polyoxyethylene monostearate, agents of the class of sucrose mono- or di-esters with higher fatty acids, agents of the class of glycerol monoesters of higher acid esters, agents of the class of bile salts, etc.

Generally it is preferred to employ surface-active agents in order to stabilize the foam for dehydration since these agents are especially effective even when employed in very small proportion, for example, from 0.1 to 2% by weight based on the weight of solids in the liquid. However, the foam stabilizer may be a mixture of a surface-active agent and a hydrophilic colloid or may be a hydrophilic colloid alone.

Typical examples of hydrophilic colloids which may be employed are: Albumin, dried egg-white, dried glucose-free egg-white, gelatin, sodium gluten sulphate, sodium gluten phosphate, polyvinylpyrrolidone, polyvinyl alcohol, soluble starch, sodium carboxymethyl cellulose, methyl cellulose, agar, gum tragacanth, gum arabic, gum acacia, gum karaya, carragheen, alginic acid, sodium alginate, pectin, dextran, dextrin, sodium carboxymethyl starch, sodium carboxymethyl amylose, sodium carboxymethyl amylopectin, pentosans, etc. Generally, it is preferred to employ as the hydrophilic colloid, water-dispersible proteins such as albumin, dried-egg white preparations, or the like.

Having prepared a foam as above described, it is subjected to dehydration to produce a porous dry product. To enhance the surface of the foam exposed to the drying conditions, it is preferred that it be in the form of a relatively thin layer, for example, an elongated sheet or strings, rods, or other filamentary shapes. The foam may be shaped into such structures by application of conventional extrusion procedures. Generally, the foam is formed into bodies having a thickness of about 0.01 to 0.5 inch. The foam may then be dehydrated while supported on trays or equivalent supports, perforated or imperforate. In a preferred modification, the foam is formed into a cratered or perforated mat. This may be accomplished as disclosed in the U.S. patent of L. F. Ginnette et al., No. 2,981,629, issued April 25, 1961. To this end, the foam is spread as a mat on a perforated sheet. The thickness of the mat is generally about from 0.01 to 0.5 inch. In applying the foam onto the perforated sheet, the applicator means may be one that deposits the foam only onto the top surface of the sheet. As the perforated sheet, various structures may be used. A preferred structure is the ordinary perforated sheet metal of commerce which is provided with circular apertures in staggered rows. Typically, such sheets may have holes from about 1/16" to 1/2" in diameter, spaced on centers to provide an open area of anywhere from 20 to 60% of the total area of the sheet. The sheet bearing the mat of foam is then subjected to a blast of air or other gas directed upwardly through the perforations in the sheet. This blast of gas causes the portions of foam in and overlying the perforations to be upwardly and laterally away from the perforations toward imperforate sections of the supporting surface. The net result is that the layer of foam is now perforated, the perforations in the mat of foam corresponding with the perforations in the supporting surface. Because of the stiff nature of the foam, this new configuration is stable and is retained during subsequent treatment. The perforated foam is in prime condition for dehydration because its surface area has been multiplied many times. Depending on such factors as the depth of the mat of foam and the structure of the supporting surface, particularly the proportion of free space therein, the surface area may be multiplied anywhere from 5 to 25 times, or more. Having prepared this perforated mat of foam, it is subjected to dehydration as described herein. The surface-sealing step and final dehydration (where necessary) may also be applied to the product still in the state of a perforated foam or after dehydration the product may be removed from the supporting surface and subjected to the surface-sealing step while in bulk or supported on trays of screening or perforated metal or while contained in a rotary device to assure uniform treatment.

After the foam has been shaped into a desired configuration, as explained above, it is subjected to dehydration. Various methods and equipment can be employed for this purpose. For example, the foam may be subjected to vacuum. During application of the vacuum, heat may be applied, for example, by radiant heaters which direct their energy to the foam, to the support carrying the foam, or to both at the same time. As with other dehydration procedures disclosed below, the amount of heat applied is limited to avoid any substantial reduction in the volume of the foam. Although vacuum dehydration may be used it is not preferred because of the expense of the equipment and the high cost of maintaining the vacuum. Thus, we prefer to conduct the dehydration by applying a hot gas to the foam under normal (atmospheric) pressure. Generally, air is used as the gaseous medium for this dehydration but it is by no means essential to use it. Thus, if desired, oxygen-free gases may be used to avoid any possibilty of oxidation of the product. In such event one may use inert gases such as nitrogen; carbon dioxide; helium; or combustion gases resulting from the burning of coal, coke, petroleum oils, or more preferably natural gas. It is, of course, obvious that where food products are being treated the gaseous medium should be non-toxic.

In conducting the dehydration by application of a heated gas, one may use, for example, conventional cabinet dryers wherein trays bearing the foam are subjected to a current of hot gaseous medium. Continuous dehydrators of various types may be used, for example, dryers equipped with mechanical drive arrangements to move a supporting means—individual trays or a continuous belt—bearing the foam through the apparatus while it is contacted with hot gas. Various system may be used for applying the gas to the foam, for example, the gas stream may be applied in concurrent, countercurrent, or cross-wise directions. In drying a perforated mat of foam, it is preferred to force the gas stream through the perforations in the mat of foam. Systems employing a compartmentalized dehydrator may be used to provide different gas temperatures at different stages as the material is dehydrated. Such systems are useful to obtain a high rate of moisture evaporation (by use of a high gas temperature) while the material is quite wet and the danger of overheating the product is remote. In succeeding stages the temperature of the gas may be reduced to avoid overheating as the product becomes drier and its temperature tends to approach that of the gas stream.

Generally, the temperature of the gaseous medium may range from about 100 to 300° F. Within this range the temperature may be varied in individual cases depending on such factors as the properties of the material being dried, the through-put, the rate of drying desired, and so forth. Generally, it is desired to employ as high a temperature as possible to achieve a rapid rate of dehydration. However, the temperature should not be so high as to overheat the product or cause the foam to decrease substantially in volume. Also, if the foam is in the form of a perforated mat, it should not be overheated to the extent of causing it to sag into and plug the perforations. To ensure such results, the foam may be kept under observation during dehydration and the temperature of the gas reduced if the foam shows a tendency to decrease in volume or sag to any substantial extent. It is impossible to set forth numerical temperature limits in this connection because the stability of the foam will depend on many factors including efficacy of the foam-stabilizing agent used, temperature of the foam, moisture content of the foam, size of gas bubbles in the foam, rate of heating of the foam, softening temperature of the product, etc. However, in any particular instance the gas temperature may be controlled in accordance with visual observation and this system of control affords a more reliable guide than could numerical limits. Generally, the dehydration is continued until the product loses its plastic character and is of a solid nature (considered at room temperature); this will usually be at a moisture content below 15%, preferably 10% or less.

After the product has been dehydrated it is treated as above described to effectuate the surface-sealing. A final step, required if the product has been moistened during the surface-sealing operation, is a re-drying operation.

The invention is further demonstrated by the following illustrative examples:

*Example I*

(A) The starting material was a tomato juice concentrate containing 30% solids and of a pasty consistency. Into a lot of this paste was incorporated 1% of glycerol monostearate. The material was then whipped with a power-operated beater until there was produced a foam having a density of 0.38 gram per ml.

The foam was extruded in the form of ⅛ inch diameter spaghetti onto the surface of a Teflon-fiber glass belt. The belt was passed through a cross-flow drier wherein the foam was contacted with air at 160° F. for 12 minutes and then with air at 130° F. for 3 minutes. The dehydrated foam product was cooled to room temperature and removed from the belt. The product had a moisture content of 3% and in color was pale pink.

(B) The dehydrated product prepared as described above was spread on a Teflon-glass fiber sheet at a loading of 50 grams per square foot and placed in a steam blanching chamber wherein the product was exposed to steam at 212° F. for 3 minutes. The product (moisture content 20%) was removed from the blanching chamber and re-dried in the cross-flow drier applying air at 130° F. for 5 minutes. The moisture content of the product was 3%; its color was a deep tomato red. The volume of the product was approximately 50% of that before applying the moistening step.

*Example II*

A lot of dehydrated tomato concentrate prepared as in Example I, part A, was heated to 130° F. in an oven, then passed between two drums 12 inches in diameter, rotating at 1 r.p.m., heated to 200° F. and spaced 0.005 inch apart. The resulting product was observed to have a deep tomato red color.

*Example III*

A lot of dehydrated tomato concentrate prepared as described in Example I, part A, was exposed to air at room temperature and 90% relative humidity until the moisture content of the product was 8%. This material softened by this moistening step was passed between two drums 12 inches in diameter, rotating at 1 r.p.m., heated to 200° F., and spaced 0.005 inch apart. The resulting product was then re-dried to 3% moisture in a cross-flow drier with air at 130° F. The product was observed to have a deep tomato red color.

Having thus described the invention, what is claimed is:
1. The process which comprises gasifying a liquid material and forming it into a stable foam, dehydrating the foam to produce a porous dehydrated product, and subjecting this product to essentially surface-localized fusing to reduce the porosity of the surface.

2. The process of claim 1 wherein the said surface-localized fusing is effected by exposing the dehydrated product to moisture in the vapor phase.

3. The process of claim 1 wherein the said surface-localized fusing is effected by heating the dehydrated product.

4. The process of claim 1 wherein the said surface-localized fusing is effected by exposing the dehydrated product to heat and to moisture in the vapor phase.

5. The process of claim 1 wherein the said surface-localized fusing is effected by tempering and pressing the dehydrated product.

6. The process which comprises gasifying a liquid material and forming it into a stable foam, dehydrating the foam to produce a porous dehydrated product, exposing the said product to a gas having a relative humidity about from 60 to 100% at a temperature about from 100 to 212° F., continuing the exposure of the said product to said gas for a period sufficient to cause a surface-sealing of the product but insufficient to cause complete loss of porosity, discontinuing said exposure, and re-drying the surface-sealed product.

7. The process of claim 6 wherein the liquid material is a liquid food.

8. The process of claim 6 wherein the liquid material is tomato juice concentrate.

9. The process which comprises gasifying a liquid material and forming it into a stable foam, dehydrating the foam to produce a porous dehydrated product, tempering the said product to soften it, and pressing the tempered product at a pressure sufficient to attain a sealing of the surface of the product but insufficient to cause complete loss of porosity.

10. The process of claim 9 wherein the liquid material is a liquid food.

11. The process of claim 9 wherein the liquid material is tomato juice concentrate.

12. A process for improving the properties of dehydrated products which comprises subjecting a solid, highly porous, dehydrated product to essentially surface-localized fusing to reduce the porosity of the surface.

13. The process of claim 12 wherein the said dehydrated product is a dehydrated food.

References Cited in the file of this patent

UNITED STATES PATENTS 2,967,109    Morgan _____ Jan. 3, 1961

OTHER REFERENCES

Eskew et al.: "Potato Flakes of Increased Density," September 1960, ARS 73–30, pp. 6–17, U.S. Dept. of Agriculture.